United States Patent [19]

Lynch

[11] Patent Number: 5,328,953
[45] Date of Patent: Jul. 12, 1994

[54] RUBBER COMPOSITIONS WITH ALKOXYALKANOIC ACID HAVING IMPROVED PROCESSABILITY VULCANISATE PROPERTIES

[75] Inventor: Eric R. Lynch, Brussels, Belgium

[73] Assignee: Monsanto Europe S.A./N.V., Brussels, Belgium

[21] Appl. No.: 942,881

[22] Filed: Sep. 11, 1992

Related U.S. Application Data

[63] Continuation of Ser. No. 796,503, Nov. 22, 1991, abandoned.

[30] Foreign Application Priority Data

Nov. 28, 1990 [EP] European Pat. Off. ........ 90870234.3

[51] Int. Cl.$^5$ .............................................. C08C 19/20
[52] U.S. Cl. .............................. 525/332.7; 525/330.9; 525/331.8; 525/346; 525/349
[58] Field of Search ................ 525/330.9, 331.7, 332.5, 525/332.7

[56] References Cited

U.S. PATENT DOCUMENTS

| | | | |
|---|---|---|---|
| 1,467,197 | 9/1923 | Russell | 525/346 |
| 2,306,669 | 12/1942 | Sturgis . | |
| 2,429,858 | 10/1947 | Vincent et al. . | |
| 4,259,403 | 3/1981 | Tomlinson | 428/378 |
| 5,023,289 | 6/1991 | Lynch | 524/302 |

FOREIGN PATENT DOCUMENTS

| | | |
|---|---|---|
| 1470970 | 2/1969 | Fed. Rep. of Germany . |
| 45-006934 | 10/1970 | Japan . |
| 273958 | 6/1951 | Switzerland . |
| 1302360 | 1/1973 | United Kingdom . |

*Primary Examiner*—Christopher Henderson
*Attorney, Agent, or Firm*—Gordon B. Seward

[57] ABSTRACT

Alkyloxyalkanoic acids, salts or esters having the formula $$R^1-O-(CR^3R^4)_x CO_2R^2$$

where $R^1$ represents an alkyl or alkenyl group, or a hydroxy- or alkoxy- substituted alkyl or alkenyl group, said group containing (apart from the alkoxy carbon atoms in an alkoxy-substituted alkyl or alkenyl group) from 1 to 22 carbon atoms, $R^2$ represents hydrogen, a metallic or other cationic group, each of $R^3$ and $R^4$ represents independently hydrogen or an alkyl group, and x has a value of from 1 to 10, act as agents useful for modifying rubber properties. Compared with conventional processing aids, they improve the processing characteristics of unvulcanised rubber compositions and can have beneficial effect on the physical properties of vulcanisates obtained by the vulcanisation of such compositions.

4 Claims, No Drawings

RUBBER COMPOSITIONS WITH ALKOXYALKANOIC ACID HAVING IMPROVED PROCESSABILITY VULCANISATE PROPERTIES

This is a continuation of application Ser. No. 07/796,503, filed Nov. 22, 1991, now abandoned.

This invention relates to rubber compositions having improved processability and improved vulcanisate properties.

The mixing of rubber with other ingredients such as are required to give a composition which is vulcanisable on heating, is a process with a high energy consumption, and typically an ingredient having the effect of reducing the viscosity of the rubber compound is included. A reduction in viscosity means that for a given degree of mixing the power consumption is reduced, the throughput rate of the mixing equipment is increased, and the maximum temperature which the compound attains is reduced. Similar considerations apply to other processing operations such as the calendering, extrusion or injection moulding of rubber compounds.

Against these beneficial effects of processability aids has to be offset the fact that most materials currently used for this purpose, for example rubber-compatible hydrocarbon oils, tend to affect adversely the physical properties of the vulcanisate. The amount which can be added to improve the processability of the compound before vulcanisation is therefore limited. There is therefore a need for materials which could be added to rubber to improve processability without adversely changing physical properties such as modulus and hardness.

Among other additives for rubber which have been proposed are "reactive plasticisers" disclosed in Japanese Patent Publication No. 45 (1970)-6,934. These are high-boiling petroleum fractions or unsaturated animal or vegetable oils modified by the introduction of functional groups, for example groups derived from thioglycollic acid. U.S. Pat. No. 2,429,858 discloses a method of improving the processability of butadiene-styrene elastomers by the incorporation therein of a terpene thioether of an alpha-mercaptocarboxylic acid or a metal salt of such an acid. It is shown in U.S. Pat. No. 2,429,858 that the use of the terpene thioethers permits a significant reduction in the milling time, but no data on the properties of the vulcanisates are given.

We have now found that certain alkyloxycarboxylic acids as defined below, and hereinafter referred to as agents useful for modifying rubber properties ("RMA"), have advantages over the processing aids of the prior art. The RMA's herein are particularly useful in that they aid in the processing of rubber, such as reducing the viscosity before vulcanisation, and in improving desirable physical properties of the vulcanised rubber inclusive of hardness and modulus.

In particular, the use of the RMA's according to the invention yield rubber compounds having processability characteristics which are generally better than those of rubber compounds containing the same weight of a conventional process oil. In addition the vulcanisates made using RMA have improved physical properties, especially improved hardness and modulus relative to compounds containing conventional additives. Furthermore, improvements relative to the thioethers of the prior art can be obtained with RMA's according to the present invention.

The present invention provides a rubber composition comprising an unvulcanised rubber polymer and, as an agent for modifying rubber properties (RMA), an alkyloxyalkanoic acid or salt having the formula

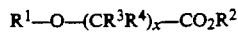

where $R^1$ represents an alkyl or alkenyl group, or a hydroxy- or alkoxy- substituted alkyl or alkenyl group, said group containing (apart from the alkoxy carbon atoms in an alkoxy-substituted alkyl or alkenyl group) from 1 to 22 carbon atoms, $R^2$ represents hydrogen, a metallic or other cationic group each of $R^3$ and $R^4$ represents independently hydrogen or an alkyl group having from 1 to 22 carbon atoms and x has a value of from 1 to 10.

In another aspect, the invention provides a method of improving the processability of rubber and modifying certain properties of the vulcanised rubber, which comprises incorporating in the rubber an alkyloxyalkanoic acid, as defined above.

In the above formula of the RMA, $R^1$ can in principle be any straight or branched chain alkyl or alkenyl group having from 1 to 22 carbon atoms, for example straight-chain butyl, pentyl, hexyl, heptyl, octyl, octenyl, nonyl, decyl, dodecyl, dodecenyl, tetradecyl, hexadecyl, or octadecyl, or any of the branched-chain isomers thereof. A hydroxy- or alkoxy-substituted alkyl or alkenyl group can contain one or more such substituents, normally one or two. An alkoxy substituent is preferably one containing from 1 to 4 carbon atoms, for example methoxy or ethoxy.

Where $R^2$ represents a metallic or other cationic group, this can be for instance an alkali metal ion, for example sodium. $R^2$ can alternatively represent the equivalent of a multivalent metal, for instance magnesium, calcium, barium, zinc, nickel, cobalt, or aluminium. Of these, zinc is the preferred multivalent metal.

A cationic group $R^2$ can also be one derived from ammonia or an amine, for example an amine having the formula $R^5R^6NH$ where $R^5$ and $R^6$ each represent hydrogen, an alkyl group, a cycloalkyl group, a benzyl group or a phenyl group, provided that $R^5$ and $R^6$ are not simultaneously both hydrogen or both phenyl. Cationic groups $R^2$ may also be derived from other nitrogenous bases, for example guanidine or diphenyl guanidine.

When $R^3$ or $R^4$ represents an alkyl group, this is preferably a group containing from 1 to 22 carbon atoms, especially a methyl or ethyl group. Preferably at least one of $R^3$ and $R^4$ attached to the carbon atom in each group $CR^3R^4$ is hydrogen. Preferred compounds are those in which x has a value of from 1 to 4. In one preferred embodiment $R^1$ can be represented by a straight chain alkyl group of from 10 to 20 carbon atoms, $R^3$ represents hydrogen, $R^4$ represents hydrogen or a methyl group, and x has a value of 1, 2 or 3. In another preferred embodiment $R^1$ can be an alkyl group having from 1 to 8 carbon atoms and x has a value of 1,2 or 3.

Several methods are available for the preparation of alkyloxyalkanoic acids useful in accordance with the invention. Alkoxyacetic acids (where $R^3$ and $R^4$ are H and x is 1) can be made from chloroacetic acid and the appropriate alkanol under basic conditions. Similarly alkoxypropionic acids (x is 2) can be made from 3-bromo propionic acid and the appropriate alkanol in basic conditions. Alkoxypropionic acids (where $R^3$ and $R^4$ — are H; and x is 2) can be made by hydrolysis of the corresponding nitriles $ROCH_2CH_2CN$ as described by R. V. Christian Jr., and R. M. Hixon in J.A.C.S., 1948, 70, 133-6. These nitriles are made from acrylonitrile and the appropriate alkanol under basic conditions.

The agents for modifying rubber properties described above are especially effective in compositions in which the rubber is cis-polyisoprene, either natural or synthetic, but they are also useful with other rubbers, including for example poly-1,3-butadiene, copolymers of 1,3-butadiene with other monomers, for example styrene, acrylonitrile, isobutylene and methyl methacrylate, ethylene-propylene-diene terpolymers (EPDM), maleic acid-grafted EPDM, and halogen-containing rubbers such as chlorobutyl, bromobutyl and chloroprene rubbers. In other instances, the rubber polymer in a rubber composition of the invention can be a blend of two or more of the rubbers exemplified above, for example a blend of natural rubber and styrene-butadiene rubber. Particularly preferred is natural rubber.

The amount of RMA in a composition of the invention will vary depending on the nature of the rubber polymer, the quantitative and qualitative unvulcanised and vulcanised rubber properties required, and whether or not other additives are included. Usually, however, the amount of RMA will be within the range from 0.2 to 10 parts by weight of rubber, and more especially within the range from 0.5 to 5 parts by weight per 100 parts by weight of rubber.

The RMA's can as described in more detail hereinbefore, be used to facilate the processability of raw rubber polymer and to procure improved vulcanisate properties. They are particularly useful in fully compounded rubber stocks containing a reinforcing agent and/or a filler, a vulcanising agent, and, a conventional process aid, such as a processing oil or mixtures of the like processing aids, and an accelerator. Conventionally used reinforcing fillers include carbon black, for example a carbon black of the N300 series such as N347 or N326, which typically is used in an amount of from 30 to 90 parts by weight per 100 parts by weight of rubber. Other additives include, for example, zinc oxide, which may be used in an amount of, for instance, from 2 to 10 parts by weight per 100 parts by weight of rubber; stearic acid at a level of, for instance, from 0.5 to 2 parts by weight per 100 parts by weight of rubber (although a feature of the present invention is that in compositions containing RMA's which are alkyloxyalkanoic acids or salts the amount of stearic acid can be significantly reduced or it may not be needed at all); antidegradants, for example N-alkyl-N'-phenyl-p-phenylenediamines; and antioxidants, for example polymers of 2,2,4-trimethyl-1,2-dihydroquinoline. Other reinforcing agents and/or fillers may be used, for example silica, and the rubber stocks may also contain metal oxide activators other than zinc oxide, for example magnesium oxide, pre-vulcanisation inhibitors, for instance N-cyclohexylthiophthalimide, and post-vulcanisation stabilisers and rubber-metal bonding promoters, for example the thiosulphate derivatives described in EP-B-0 070 143 and EP-B-109 955.

The RMA can be incorporated into the rubber, together with additives, except the vulcanising agent and the vulcanisation accelerator, during a first stage mixing, using, for example, an internal mixer or a mill. In an alternative procedure, the RMA can be incorporated along with the vulcanising agent and accelerator during a second stage mixing. If sulphur is used as the vulcanising agent, the amount is typically in the range from 0.3 to 6 parts by weight per 100 parts by weight of rubber.

Accelerators which can be used include the benzothiazole-2-sulphenamides, for instance N-isopropyl-benzothiazole-2-sulphenamide, N-tert-butyl-benzothiazole-2-sulphenamide, N-cyclobenzothiazole-2-sulphenamide, N,N-dicyclohexyl-benzothiazole-2-sulphenamide and 2-(morpholinothio)benzothiazole. In the compositions of the invention, these are typically used in amounts of from 0.1 to 3 parts by weight per 100 parts by weight of rubber depending on the nature of the rubber, the amount of sulphur, and the properties required in the cured rubber. Other curing systems using sulphur donors, for example dimorpholine disulphide, can be used.

As indicated above, the RMA's used in this invention can be incorporated into the rubber by conventional mixing procedures. Most of the RMA's are in a state such that no special precautions are necessary for obtaining good dispersions. In the processing of natural rubber it is customary to subject the raw rubber to a mastication before the introduction of any additives. By means of the RMA's herein, however, particular benefits can be obtained inclusive of accelerated mastication if the RMA is added alone, particularly for natural rubber, during the primary mastication stage. If necessary, higher melting solids can be ground to a fine powder, preferably 70 micrometres particle size or less, to promote adequate dispersion. In certain instances, it is convenient to add a solid RMA as a predispersion of particulate material in a rubber-compatible hydrocarbon oil or polymer, for example EPDM rubber.

The invention is illustrated by the following specific embodiments.

For the evaluation of the RMA's of the invention, masterbatches of the following compositions were employed:

|  | I | II |
|---|---|---|
|  | Parts by weight of rubber (phr) | |
| Natural rubber SMR 10 | 100 | 100 |
| N 375 carbon black | 50 | — |
| N330 carbon black | — | 80 |
| Zinc Oxide | 5 | 5 |
| Tackifier resin[1] | — | 5 |
| Aromatic Process Oil | — | 10 |
| Stearic Acid | 2 | 2 |
| Antidegradant[2] | 2 | 2 |
| Sulphur | 2.5 | 3.5 |
| Accelerator[3] | 0.6 | 0.7 |

[1]Escorez ® 1102B
[2]N-1,3-dimethylbutyl-N'-phenyl-p-phenylenediamine
[3]N-Cyclohexylbenzothiazole-2-sulphenamide.

The natural rubber was premasticated before the addition of other ingredients, to a viscosity of about 50 Mooney Units ML (1+4) at 100° C.

For mixing, a laboratory scale BR Banbury internal mixer was used. For Masterbatch I the ingredients were incorporated in accordance with the following schedule at intervals determined by the integral value of power consumption of the mixer. The premasticated rubber was loaded, the temperature of the mixer (water circulation) being 40° C.

| Power integral Value (kwh) | Operation |
|---|---|
| 0 | Add half of carbon black and zinc oxide to rubber. |
| 0.125 | Add remaining carbon black antidegradant, stearic acid, processing oil or (in test |

-continued

| Power integral Value (kwh) | Operation |
|---|---|
|  | batches), RMA (3 parts by weight per 100 parts by weight of rubber). |
| 0.350 | Sweep, add sulphur and accelerator. |
| 0.400 | Dump |

For Masterbach II, the pre-masticated rubber was combined with the other ingredients by the two-stage procedure A and B below.

| (A) | Time (minutes) | Ingredients |
|---|---|---|
|  | 0 | Rubber and half of N330 plus the zinc oxide |
|  | 1 | Half of N330, and other ingredients, except sulphur and accelerator, but including the RMA |
|  | 3 | Sweep |
|  | 4.5 | Dump |
| (B) |  | After a waiting period of 24 hours at room temperature the rubber compound of stage A was mixed with the sulphur and accelerator in the Banbury internal mixer, not allowing the temperature to exceed 100° C., for a maximum time of 1½ minutes. |

Samples were vulcanized at 141° C. for modulus and hardness tests, the tests being performed in accordance with Standard procedures (ISO 37 and ISO 48, 1400, 1818).

In examples 1 and 2 the Tables below give results obtained with various Masterbatches based on SMR 10 rubber. The figures in parentheses (Rel) are percentages relative to the Control. The RMA's used are indicated by numbers in the lefthand columns of the Tables as follows and are used at a level of 3 parts per hundred (phr.). The Dutrex 729 aromatic processing oil was also used at 3 phr in Table 1.

Example 1

RMA's of the invention, in Masterbatch I
1. None (blank, control)
2. Ethoxyacetic acid
3. Decycloxyactic acid
4. Dodecyloxyacetic acid
5. Hexadecyloxyactic acid
6. Dodecyloxypropionic acid
7. Dutrex ®729

TABLE 1

| RMA | Mooney ML(1 + 4) 100° C. | | Hardness | | Modulus at 100% Extension | |
|---|---|---|---|---|---|---|
|  | Units | (Rel) | IRHD | (Rel) | MPa | (Rel) |
| 1 Blank | 56.2 | (100) | 71 | (100) | 3.1 | (100) |
| 2 C₂H₅OCH₂CO₂H | 49.8 | (87) | 79 | (111) | 4.0 | (129) |
| 3 C₁₀H₂₁OCH₂CO₂H | 47.8 | (85) | 73 | (103) | 3.4 | (110) |
| 4 C₁₂H₂₅OCH₂CO₂H | 49.0 | (87) | 72 | (101) | 3.3 | (106) |
| 5 C₁₆H₃₃OCH₂CO₂H | 51.4 | (91) | 74 | (104) | 3.6 | (116) |
| 6 C₁₂H₂₅OCH₂CH₂CO₂H | 48.2 | (86) | 73 | (103) | 3.7 | (119) |
| 7 DUTREX 729 | 48.9 | (87) | 67 | (94) | 2.7 | (87) |

The above results permit a comparison of stocks containing a RMA of the invention with a blank and a stock containing the Dutrex ® processing oil.

The results of Table 1 show an improvement for stocks according to the invention in respect of Mooney viscosity, hardness, and modulus. It is noteworthy that compression set and rebound resilience values were not affected by the RMA's and were, in fact, found to be identical to the corresponding values of the blank.

Example 2

RMA's of the invention in Masterbach II
1. None (blank, control)
2. Zinc salt of 3-isopropoxypropionic acid
3. Zinc salt of methoxyacetic acid
4. Zinc salt of isopropoxyacetic acid
5. Zinc salt of ethoxyacetic acid

| RMA | Mooney ML (1 + 4) 100° C. | | Hardness | | Modulus at 100% Extension | |
|---|---|---|---|---|---|---|
|  | Units | (Rel) | IRHD | (Rel) | MPa | (Rel) |
| 1 | 71.2 | (100) | 78 | (100) | 5.3 | (100) |
| 2 | 59.6 | (84) | 83 | (106) | 6.4 | (121) |
| 3 | 69.4 | (97) | 82 | (105) | 6.8 | (128) |
| 4 | 64.6 | (91) | 85 | (109) | 6.8 | (128) |
| 5 | 64.8 | (91) | 85 | (109) | 6.6 | (125) |

Table 2 shows that rubber stocks according to the invention are improved in respect of Mooney viscosity, hardness, and modulus. Resilience and compression set were little changed, relative to the corresponding values for the blank.

I claim:

1. A rubber composition comprising an unvulcanised rubber polymer, sulfur or a sulfur donor, a benzothiazole-2-sulphenamide accelerator, and, as an agent for modifying rubber properties (RMA) an alkyloxy alkanoic acid or salt having the formula $$R^1-O-(CR^3R^4)_x-CO_2R^2$$

where $R^1$ represents a straight-chain alkyl group containing from 10 to 20 carbon atoms, $R^2$ represents hydrogen, or an equivalent of zinc, each of $R^3$ and $R^4$ represents independently hydrogen or an alkyl group, having from 1 to 22 carbon atoms and x has a value of from 1 to 10.

2. A composition according to claim 1 wherein each $R^3$ and each $R^4$ independently represents hydrogen or a methyl or ethyl group and x has a value of from 1 to 4.

3. A composition according to claim 2 wherein $R^3$ represents hydrogen, $R^4$ represents hydrogen or a methyl group, and x has a value of 1, 2 and 3.

4. A composition according to claim 1, 2 or 3 wherein the amount of the RMA is from 0.2 to 5 parts by weight per 100 parts by weight of rubber.

* * * * *